United States Patent [19]

Uhlig

[11] Patent Number: 4,821,874
[45] Date of Patent: Apr. 18, 1989

[54] REUSABLE WRAP-TYPE MULTI-PACK CARRIER

[75] Inventor: Albert R. Uhlig, Toledo, Ohio

[73] Assignee: Owens-Illinois Plastic Products Inc., Toledo, Ohio

[21] Appl. No.: 681,393

[22] Filed: Dec. 13, 1984

[51] Int. Cl.⁴ ............................................. B65D 71/06
[52] U.S. Cl. ................................. 206/140; 206/434; 229/40
[58] Field of Search ............... 206/1.5, 140, 145–148, 206/152–158, 193–199, 203, 427, 434; 229/40, 45 R

[56] References Cited

U.S. PATENT DOCUMENTS

| | | | |
|---|---|---|---|
| 1,850,714 | 3/1932 | Gaylord | 206/145 |
| 2,950,039 | 8/1960 | Wilson | 206/815 |
| 3,175,684 | 3/1965 | Andre et al. | 206/155 |
| 3,253,706 | 5/1966 | Spillson | 206/158 |
| 3,279,648 | 10/1966 | Worthington | 206/196 |
| 3,357,630 | 12/1967 | Michelitsch | 229/45 |
| 3,596,796 | 8/1971 | Stembridge | 206/193 |
| 3,601,439 | 8/1971 | Poupitch | 206/145 |
| 3,961,708 | 6/1976 | von Dohlen et al. | 206/203 |
| 3,963,121 | 6/1976 | Kipp | 206/434 |
| 4,303,153 | 12/1981 | Boulton | 206/203 |

FOREIGN PATENT DOCUMENTS 1416404 6/1973 United Kingdom .

Primary Examiner—Jimmy G. Foster

[57] ABSTRACT

A single-piece, reusable, wrap-type, multi-pack carrier for a plurality of beverage containers. The carrier is shaped to separate the containers carried thereby from contacting one another during transportation in such carrier, and comprises disengageable and re-engageable locking means to permit the locked carrier to be opened and reclosed. A preferred embodiment of such carrier is formed by vacuum forming or thermoforming a die-cut sheet of a thermoplastic material.

3 Claims, 7 Drawing Sheets

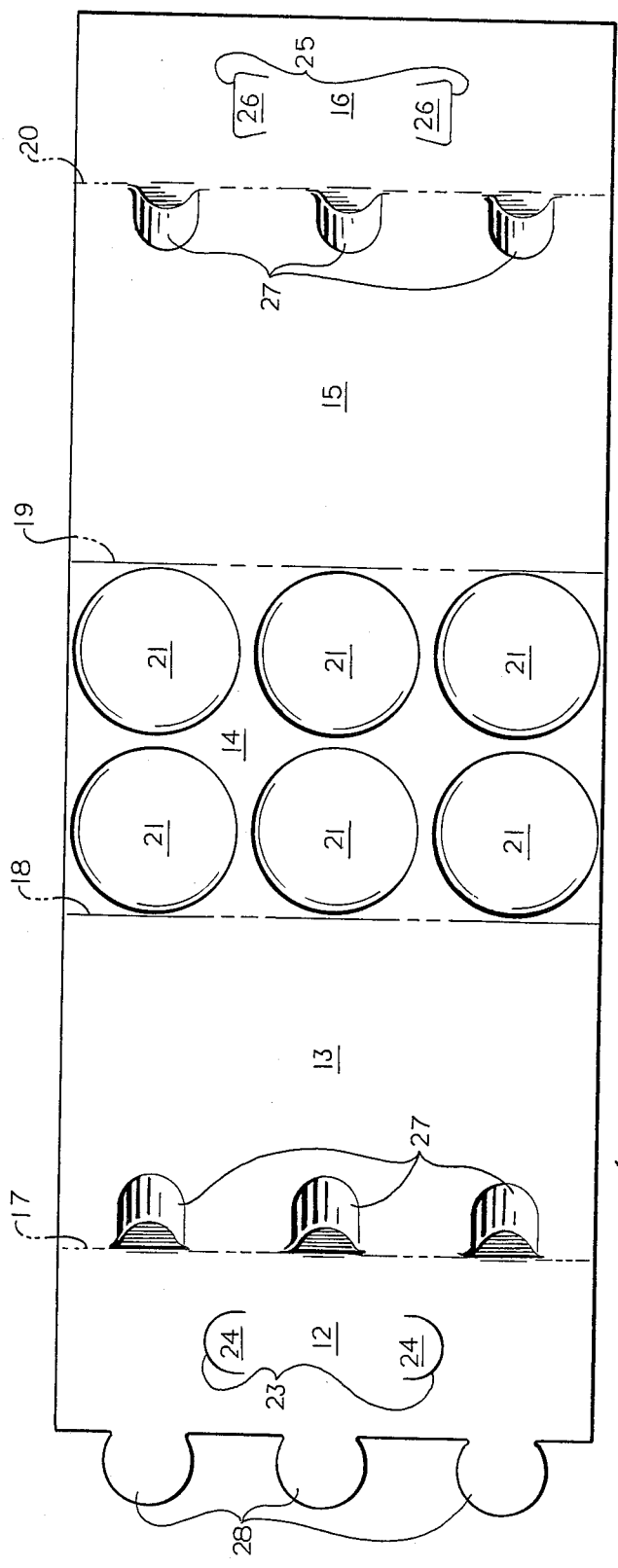
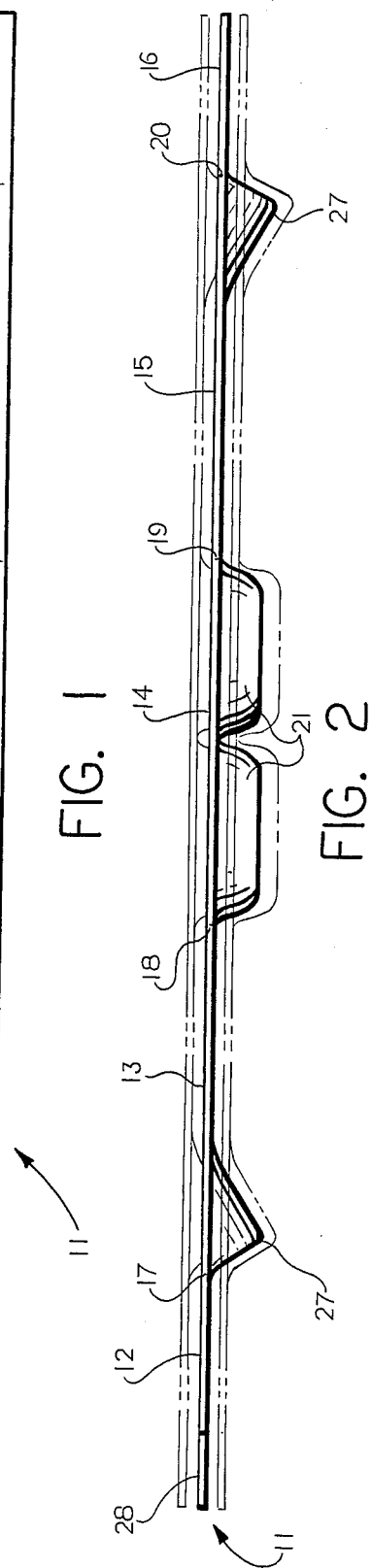
FIG. 1
FIG. 2

REUSABLE WRAP-TYPE MULTI-PACK CARRIER

BACKGROUND OF THE INVENTION

This invention relates in general to a wrap-type multi-pack carrier for the carrying of a multiplicity of bottles or other containers. More particularly, this invention relates to a reusable, wrap-type, multi-pack carrier for the carrying of a multiplicity of returnable bottles or other returnable containers. Even more particularly, this invention relates to a single piece, shaped, reusable, wrap-type multi-pack carrier for the carrying of a multiplicity of returnable bottles or other returnable containers, with the shaping of the carrier serving to provide means separating the containers carried thereby to prevent them from contacting one another during transportation in such carrier, both in the filled state and during the return of the empty containers for refilling or recycling.

Paperboard, wrap-type, multi-pack carriers are widely used in the packaging of disposable bottles and cans for beer, soft drinks and other beverages, and the carriers used for such purposes are, of necessity, relatively light in weight and therefore not reusable. Also, such carriers generally must be torn or otherwise irreparably damaged to conveniently extract the containers therefrom, a feature which, while not particularly objectionable in a carrier that is not intended for reuse, is unacceptable in a carrier which is intended to be reused. Additionally, such carriers are generally formed from paperboard or other non-moldable, sheetlike material, and separate dividers must be provided with carriers of this type to prevent the containers carried by the carrier from contacting one another. Furthermore, when paperboard is used in the construction of such carriers, they are subject to loss of strength if they become wet or damp, a situation which can occur due to the breakage or leakage of one or more of the packaged containers or due to moisture condensation on the containers when they are refrigerated.

Multi-pack carriers for refillable bottles, or other types of containers which are designed to be returned for recycling, are widely used, but the known carriers are of the basket type, either made of a relatively heavy grade of paperboard or of plastic, as is shown in U.S. Pat. Nos. 3,589,553 (Culver, et al.), 3,484,019 (Hirota), 4,204,596 (Davis) and 4,201,295 (Morcorm). However, such carriers do not positively engage all portions of the carried containers as effectively as the wrap-type carriers, and therefore these carriers permit such containers to fall out when the carrier is inverted and they expose more portions of the containers to impact damage during the handling and shipment of the containers, both in the filled condition and during the return of the emptied containers. Such impact damage is particularly objectionable in the case of glass bottles which are intended to be used in the packaging of pressurized liquids, such as carbonated soft drinks or beer. The impact damage to the outside surface of such a glass bottle, if of a severe nature, can substantially reduce the internal pressure resistance of the bottle, and this can lead to the risk of a spontaneous and violent failure of the bottle, a safety risk to the user and/or any nearby bystanders.

SUMMARY OF THE INVENTION

In accordance with the present invention there is provided a reusable wrap-type carrier which, in the preferred embodiment, is adapted to serve as a carrier for a plurality of like refillable or recyclable bottles for the packaging of a beverage. Such carrier is formed from a shaped or molded plastic or other shaped or molded material in such a manner that shaped or molded portions of the carrier serve to separate the bottles in the carrier to help to prevent bottle to bottle contact between such bottles and the damage which can result therefrom. Such carrier is formed by the folding of a partially shaped or molded generally sheetlike blank of material around the plurality of bottles to be carried thereby, and the opposite ends of the blank are provided with disengageable and reengageable locking means to permit the ends of the blank to be locked together, separated and re-locked over and over again throughout the useful life of the carrier. In the preferred embodiment the carrier is formed from a sheet of a thermoplastic material by a process which includes a contour cutting step, such as a die-cutting step, and a thermoforming step, and by virtue of the thermoforming step a set of pockets or cups is formed in one portion of the sheet to positively engage the bottoms of the carried bottles and another set of pockets or cups is formed in another portion of the sheet to positively engage the tops of the carried bottles. Additionally the carrier can be printed or decorated in its flat condition, and this is preferable to printing or decoration on a contoured surface because it can be done in a high quality manner relatively inexpensively on high-speed continuous printing equipment, for example, by printing a web of indefinite length from which the carrier blank is formed in a die-cutting operation.

Accordingly, it is an object of the present invention to provide a reusable, wrap-type, multi-pack carrier for the carrying of a multiplicity of containers. It is a further object of the invention to provide a reusable, wrap-type multi-pack carrier which is shaped or molded to provide for separation between the containers which are carried thereby. It is a further object of the present invention to provide a shaped, reusable, wrap-type, multi-pack carrier which is formed from a blank of a generally sheetlike thermoplastic material by the locking together of the ends of such sheetlike carrier in a manner in which the ends can be repeatedly disengaged and reengaged. It is an additional object of the present invention to provide a reusable wrap-type carrier with one or more large flat surface areas containing highly visible printing and/or decorative material thereon to function as an advertisement for the beverage contained in the bottles carried by the carrier.

For a further understanding of the present invention and the objects thereof, attention is directed to the drawing and the description thereof, to the detailed description of the invention and to the appended claims.

DESCRIPTION OF THE DRAWING

FIG. 1 is a plan view of a blank from which a carrier in accordance with the present invention can be formed;

FIG. 2 is an elevational view of the blank of FIG. 1 and FIG. 2 also includes, in phantom, other like blanks in a stack thereof;

DETAILED DESCRIPTION OF THE INVENTION

Figure 3:
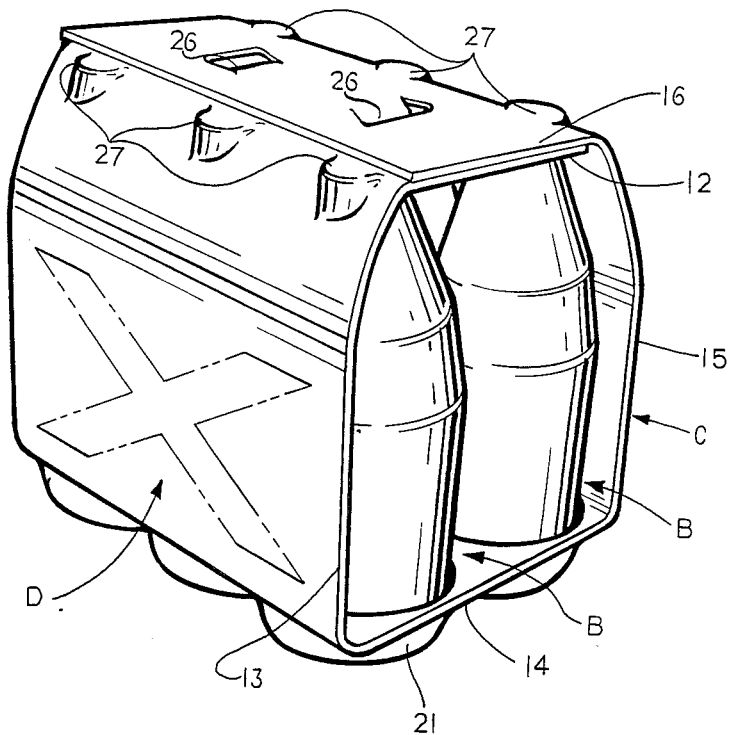
FIG. 3 is a three-dimensional view showing a wrap-type carrier which has been formed from the blank of FIGS. 1 and 2 in combination with a plurality of like bottles enclosed by such carrier.

In accordance with the present invention, as is shown in FIGS. 1 and 2, there is provided a blank which is generally indicated by reference numeral 11. Blank 11 is formed from a sheetlike material, for example by die-cutting, and when blank 11 is so formed, it is reformed into the configuration depicted in FIGS. 1 and 2 in a reforming operation such as a molding or thermoforming operation. In a preferred embodiment blank 11 is formed from a relatively rigid type of a relatively high tear strength polymeric material, such as polyethylene or polypropylene, and with such a material the reforming operation may be conveniently done by a conventional vacuum type thermoforming operation. Where it is desired to manufacture a carrier in accordance with the present invention from molded pulp, blank 11 may be formed into the desired configuration in a process utilizing a pulp molding operation, similar to the processes utilized in manufacturing egg cartons and other types of molded pulp containers. Blank 11 may also be formed from composites of plastic, plastic/paper or plastic/foil/paper materials which may be formed by lamination or extrusion coating or, in the case of all plastic composites, by co-extrusion, a technique which permits the extensive use of recycled materials.

As is shown most clearly in FIG. 2, like blanks of the type depicted in FIGS. 1 and 2 may be stacked in a partially nested relationship to one another to facilitate shipment from the plant where they are manufactured to the beverage bottling or canning plant where they are to be used, or by the consumer who has multiple emptied carriers in storage in his or her residence. In any case, blank 11 is comprised of a series of generally rectangularly-shaped panels 12, 13, 14, 15 and 16, and adjacent panels in this series are foldably connected to one another along fold lines which may be formed in blank 11 by scoring or by other known techniques. Thus, panel 13 is connected to panel 12 along fold line 17, panel 14 is connected to panel 13 along fold line 18, panel 15 is connected to panel 14 along fold line 19 and panel 16 is connected to panel 15 along fold line 20.

One of the panels of blank 11, shown as panel 14, is designed to serve as the bottom of the wrap-type carrier which is to be formed from blank 11, and is provided with a plurality of pockets 21 therein. Pockets 21, shown as six in number and aligned in three rows of two each for a six-pack carrier, which is one of the most popular applications of wrap-type beverage bottle carriers, are separated from one another, and each is adapted to receive the bottom or heel portion of a like beverage bottle and to prevent such heel portion from moving to impact against an adjacent bottle.

FIG. 3 depicts a carrier C which has been formed from blank 11 after a plurality of bottles B have been packaged therein. Carrier C may be provided with decoration D on the exposed surfaces of one or more of the panels which are incorporated in it, as is shown on panel 13 in FIG. 3, to make the total package attractive in appearance and to identify the type of beverage contained in the enclosed bottles. Because of the large flat surface area on panel 13, such decoration D serves to provide a billboard type of advertisement for the beverage packaged in the bottles carried by the carrier. As shown, after the heels of bottles have been inserted into pockets 21 of blank 11, panels 13 and 15 are folded to extend vertically upwardly from panel 14 along the sides of the bottles, and the tops of the bottles are then secured by a series of steps which starts with the inward folding of panels 12 and 16 with respect to panels 13 and 15, respectively, to lie in overlying relationship with one another, with panel 16 being on top of panel 12.

Figure 4:
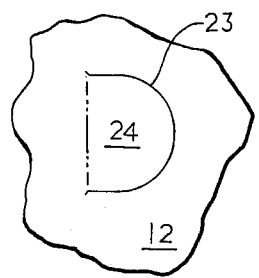
FIG. 4 is an enlarged fragmentary view of a portion of the blank depicted in FIG. 1.
Figure 5:
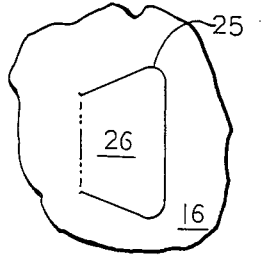
FIG. 5 is an enlarged fragmentary view of another portion of the blank depicted in FIG. 1.

Panel 12 is provided with a pair of spaced-apart, outwardly-facing U-shaped cut lines 23 which define downwardly deflectable locking tabs 24. Similarly, panel 16 is provided with a pair of spaced-apart, outwardly-facing, U-shaped cut lines 25 which define downwardly deflectable locking tabs 26. Cut lines 23 and 25 are so spaced that, when panel 16 is brought into its intended position overlying panel 12, tabs 26 will overlie tabs 24, and the ends of the blank 11 may be and are disengageably secured to one another by deflecting tabs 26 and 24 downwardly through the aligned holes defined by cut lines 25 and 23. Ideally, as is shown most clearly in FIGS. 4 and 5, tabs 26 will be slightly larger at least in some dimension than tabs 24 to provide for an interference fit after tabs 26 are forced through the holes defined by cut lines 23, to prevent accidental disengagement of the interlocked panels 12 and 16. The holes formed by the downward deflection of tabs 26 and 24, in the preferred embodiment, are sized and spaced in such a way that they will permit a person to carry the assembled carrier by inserting fingers therein, and the double thickness top structure of the carrier, formed by panels 12 and 16, constitutes a structurally reinforced region of the carrier for support in suspending the load of the carrier when carried in this manner.

To positively engage the upper portions of the bottles B carried by the carrier C, panels 13 and 15 of blank 11 are each provided with a series of generally U-shaped pockets 27 each of which engages the top portion of the adjacent bottle B, that is, the bottle which is contained in the pocket 21 which underlies such pocket 27. In a carrier C which is intended for the packaging of a plurality of bottles of the narrow-neck type, as shown, each pocket 27 will be considerably smaller than the corresponding pocket 21, and the interlocking of panels 12 and 16 to bring pockets 27 into engagement with the packaged bottles, as described, will inwardly deflect the upper portions of panels 13 and 15 to lie on tapers, relative to the lower portions of such panels, to generally follow the tapers of the bottles in the neck regions thereof. This effect, which can be seen in FIG. 3, can be accomplished in many of the kinds of thermoplastic materials which are suitable for the manufacture of blanks 11, without the need to score or otherwise deform such blanks to provide for this deflection or bending, because of the inherent flexibility of such materials.

Figure 7:
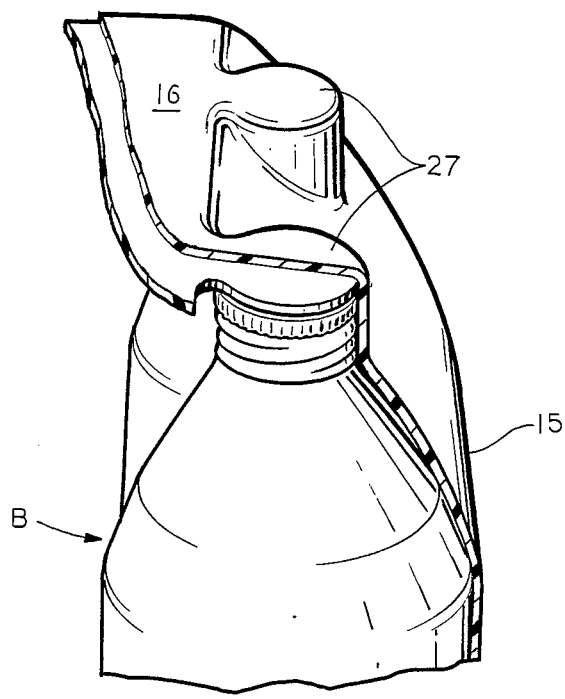
FIG. 7 is an enlarged fragmentary view of the carrier with the bottles therein as depicted in FIG. 3.
Figure 6:
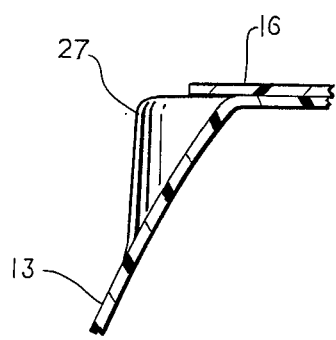
FIG. 6 is a sectional view, at an enlarged scale, taken on line 6—6 of FIG. 3, the bottle which would appear in such sectional view not being shown.
Figure 9:
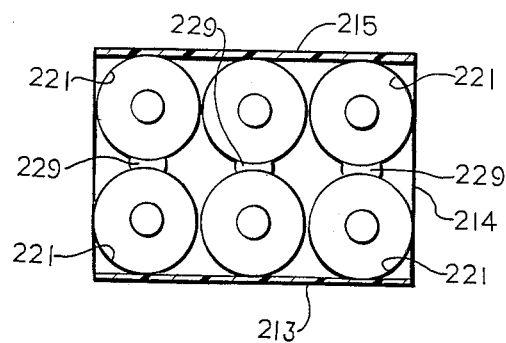
FIG. 9 is a sectional view taken on line 9—9 of FIG. 8, at a reduced scale.

Because of the fact that blank 11 has a finite thickness, there will be a small spacing between the bottoms of the pockets 27 which are adjacent the uppermost of the overlying panels 12 and 16, shown as panel 16. To prevent vertical movement of the bottles B which are retained by pockets 27 within the cups, the marginal edge of blank 11 is provided with outwardly extending tabs 28 which are adapted to fill the spacing between the bottles B engaged by the pockets 27 adjacent panel 16 and the underside of such cups. This relationship is shown in greater detail in FIG. 7.

Figure 8:
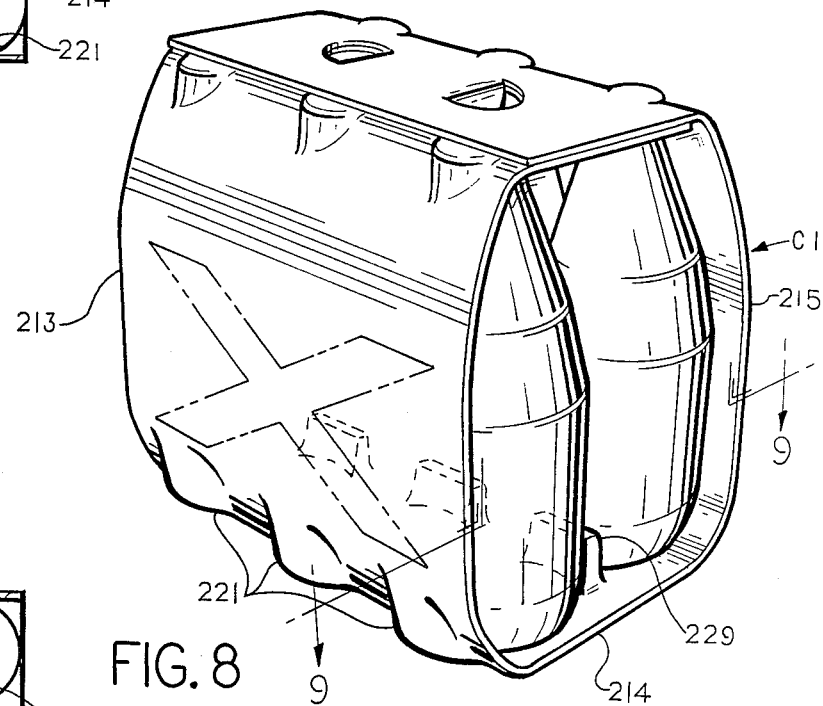
FIG. 8 is a view similar to FIG. 3 which shows an alternative embodiment of a carrier in accordance with the present invention.
Figure 11:
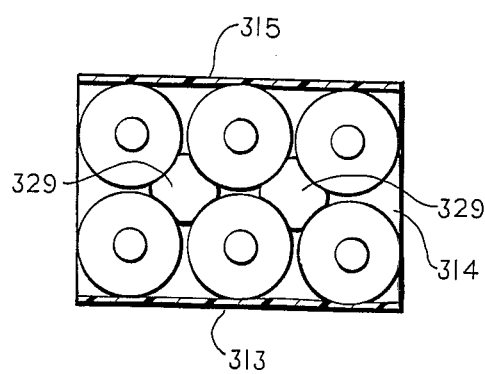
FIG. 11 is a sectional view taken on line 11—11 of FIG. 10, at a reduced scale.

The embodiment of the carrier C1 depicted in FIG. 8 differs from that depicted in FIG. 3 in that the means for retaining the bottoms of the bottles carried thereby comprises a series of spaced apart formed recesses 221 which are formed in vertically extending panels 213 and 215 at the junctures of such panels with bottom panel 214, in combination with a series of upwardly extending contoured spacers 229 which are formed integrally in bottom panel 214 by molding or vacuum forming. This series of spacers extends longitudinally along bottom panel 214 along the central axis thereof. Thus, the bottoms of a transversely extending row of two bottles are retained by one of the spacers 229 and two of the recesses 221 which are aligned with one another and with the spacer 229. Relative to the embodiment of FIG. 3, the embodiment of FIG. 8 permits the bottom portions of the side panels of the carrier to have a somewhat more toed-in appearance, which some people may consider to be aesthetically pleasing, but of course it does reduce the depth of the straight-sided portions of the sides of the carrier which may make it desirable or necessary to use a smaller pattern of decorative material on the sides.

Figure 10:
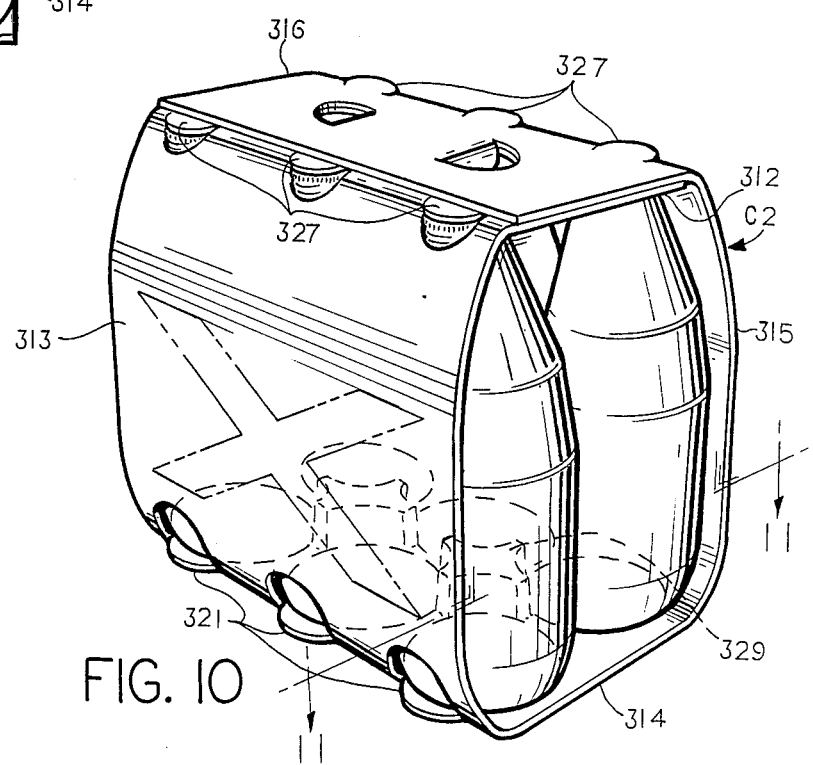
FIG. 10 is a view similar to FIGS. 3 and 8 which shows another alternative embodiment of a carrier in accordance with the present invention.
Figure 15:
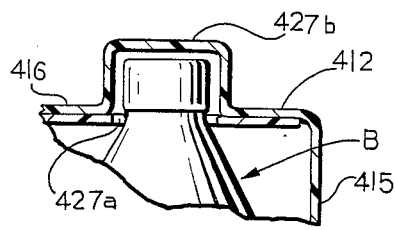
FIG. 15 is another fragmentary end view of the carrier depicted in FIG. 12, after the top panel thereof has been moved to the closed position.

The embodiment of the carrier C2 depicted in FIG. 10 differs from those depicted in FIGS. 3 and 8 partially in that the means for retaining the bottoms of the bottles carried thereby comprises a series of spaced apart die-cut holes 321 which are formed in vertically extending panels 313 and 315 at the junctures of such panels with bottom panel 314, in combination with a series of cross-shaped upwardly extending spacers 329 which are formed in bottom panel 314 by molding or vacuum forming. This series of spacers extends longitudinally along bottom panel 314, and because of the cross-shaped nature of these spacers the series comprises one fewer in number than the number of holes 321 along a side. Each spacer 329 is centered, in the longitudinal direction, between a pair of the holes along such side. Because of the cross-shaped nature of the spacers 329, the bottoms of the containers in carrier C2 are engaged somewhat more positively than those in carrier C1 of FIG. 8. The use of die-cut holes 321 as opposed to the recesses 221 of the embodiment of carrier C1 also enhances the positiveness of the engagement of the heels of the bottles by the carriers, and it permits an inspection of the bottoms of the bottles, and the contents thereof in the case of bottles which are transparent, to ensure the clarity of the beverage bottled therein, without the need to disengage the carrier to permit such inspection.

Carrier C2 also differs from the previously described carriers in that it incorporates a series of spaced-apart die-cut holes 327 which are formed at the juncture of top panel 312 and side panel 313 and at the juncture of top panel 316 and side panel 315 respectively. Holes 327 are horizontally aligned in two rows of three holes each, with each hole being vertically aligned with an underlying bottom hole 321, and each such hole 327 engages the top of a bottle whose heel is engaged by the underlying hole 321. The use of holes 327 to engage the tops of the bottles permits an inspection of the closures at the tops of the bottles to ensure that the bottles are properly capped, without the need to disengage the carrier to permit such inspection.

Figure 12:
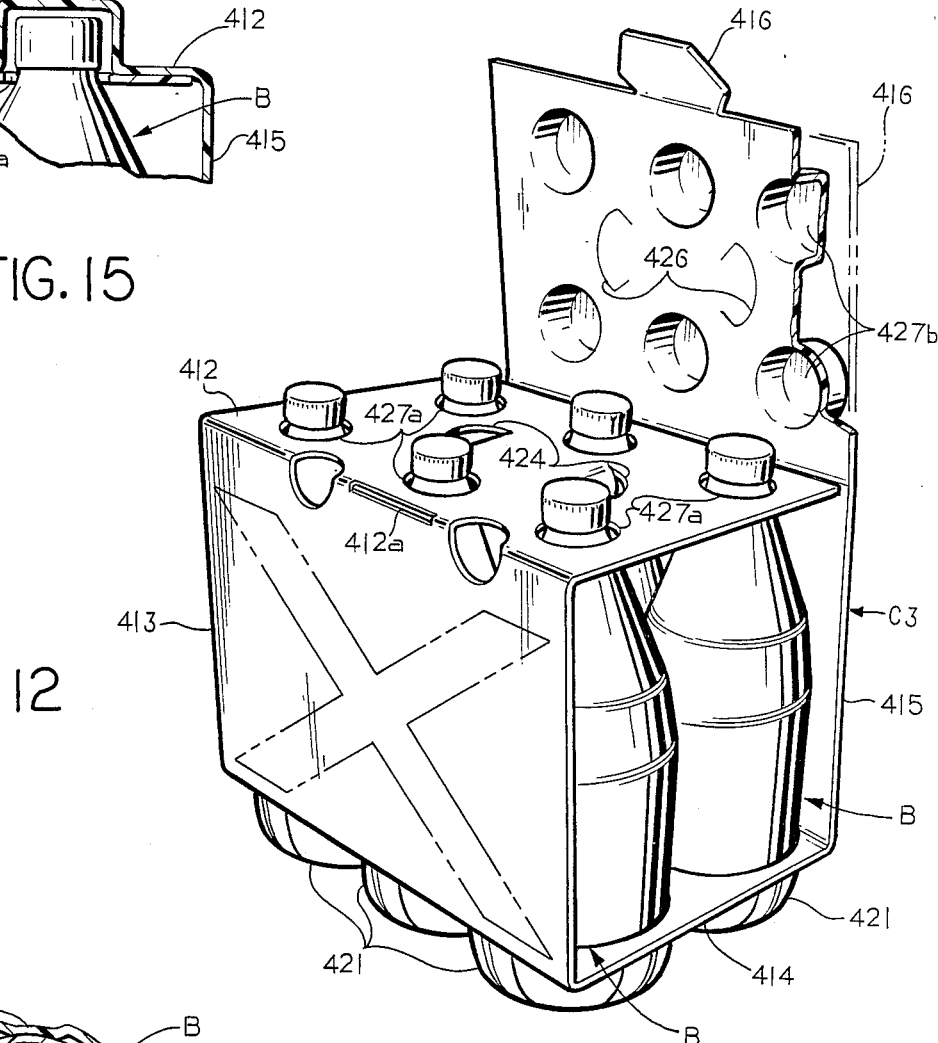
FIG. 12 is a view similar to FIGS. 3, 8 and 10 which shows another alternative embodiment of a carrier in accordance with the present invention, the top panel of such carrier being shown in the open position.
Figure 14:
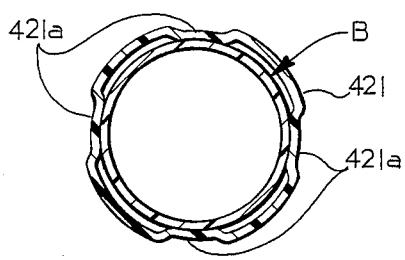
FIG. 14 is a fragmentary sectional view taken on line 14—14 of FIG. 13.
Figure 13:
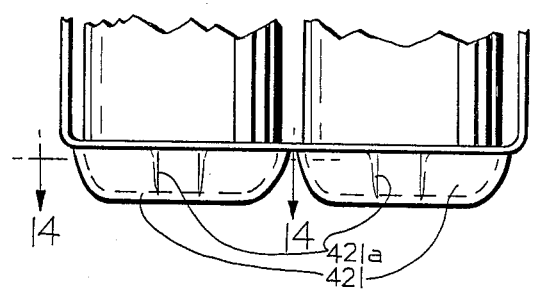
FIG. 13 is a fragmentary end view of the carrier depicted in FIG. 12.

FIG. 12 depicts an embodiment of a carrier, indicated generally by reference character C3, which may be considered to comprise a bottom 414 with pockets 421 for receiving the bottoms of bottle B therein. One of the features of the carrier C3 is that its sides 413 and 415 extend straight upwardly to the tops thereof with a top structure comprised of a panel 412 which extends inwardly from side 413 and a panel 416 which is shown in an upright, unsecured position and which extends inwardly from panel 415 to overlie panel 412 after the downward folding thereof from the illustrated position. The tops of the bottles B in carrier C3 are restrained therein in a properly spaced apart relationship partially by providing panel 412 with a series of holes 427a each of which is aligned with an underlying pocket 421 and each of which fits over the finish of a bottle B contained in the underlying pocket. The restraining of bottles B in carrier C3 is further accomplished by providing panel 416 with a series of upwardly protruding and downwardly facing pockets 427b which are aligned with holes 427a when panel 416 is positioned in overlying relationship with panel 412. Each hole 427b snugly receives the capped finish portion of a bottle B, and the securing of panels 416 and 412 to one another may be accomplished by providing panel 416 with a tab 416a which extends from the edge thereof and which is adapted to be received in a slot 412a at the juncture of panel 412 and panel 413. This locking arrangement may be in place of or in addition to a locking feature obtained between the finger hole tabs 424 in panel 412 and the finger hole tabs 426 in panel 416, as described in reference to the carrier C of FIG. 3. One of the features of bottle receiving pockets 421 of carrier C3, relative to the pockets 21 of carrier C, is that the sides of pockets 421 are provided with a series of spaced apart indented portions 421a which can be sized to provide a slight interference fit with the bottom of the bottles B to be placed therein, as is shown quite clearly in FIG. 14.

These indentations 421a will be wedged outwardly by the bottom of the bottles B when it is inserted therein, but will remain in secure, slightly constricting contact with the bottle to help to prevent its movement with respect to the pocket during the transportation or handling of the carrier.

The carrier C3 as heretofore described provides for a somewhat higher straight-sided portion in the side panels thereof, and this permits the use of large patterns of decorative material on the sides, which may be desirable to some bottlers. Additionally, the tab lock between the panels in the top structure of the carrier provides a very positive and readily manipulatable locking feature, although it does add to the amount of material required in the carrier blank.

Figure 16:
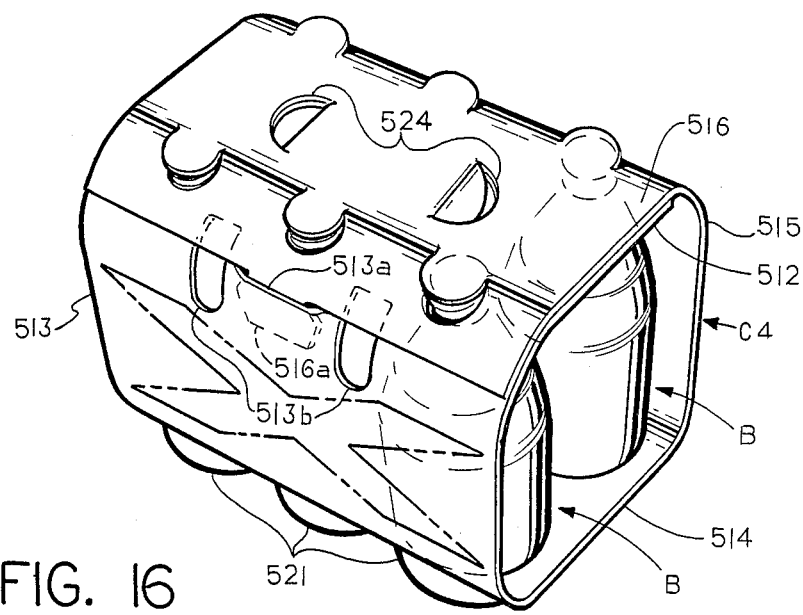
FIG. 16 is a three-dimensional view of an alternative embodiment of a carrier according to the present invention in combination with a plurality of like bottles enclosed by such carrier.

FIG. 16 depicts an embodiment of a carrier, indicated generally be reference character C4, which is shown in bottle carrying relationship with a plurality of filled and capped bottles B. The bottoms of the bottles B are held in pockets 521 in the bottom panel 514 of carrier C4, which may be similar in construction and function to the pockets 21 in the carrier C of the embodiment of FIGS. 1–8. Carrier C4 has sides 513 and 515, respectively, and a double thickness top structure made up of an inner panel 512, which extends inwardly from, and is foldably attached to, side panel 513, and an outer panel 516 which extends inwardly from, and is foldably attached to, side panel 515. The outer panel 516 has a tab 516a extending from the outer edge thereof, and the carrier C4 can be closed by providing a generally horizontal slot 513a in side panel 513 near the juncture of the side panel 513 and the inner top panel 512. Slot 513a receives the tab 516a when the panel 516 has been brought into the desired closing position relative to panel 512. Generally vertical finger receiving slots 513b may be provided on opposite sides of slot 513a to facilitate the removal of tab 516a from slot 513a as part of the procedure for opening of the carrier C4. With the locking tab and slot feature obtained by virtue of the engagement of tab 516a into slot 513a, the finger receiving carrying holes in the superimposed top panels 512 and 516 need not have the interference fit characteristics of the holes formed by the deflection of the tabs 24 and 26 of carrier C, but of course they can be constructed with such interference fit characteristics if it is desired to do so.

Figure 17:
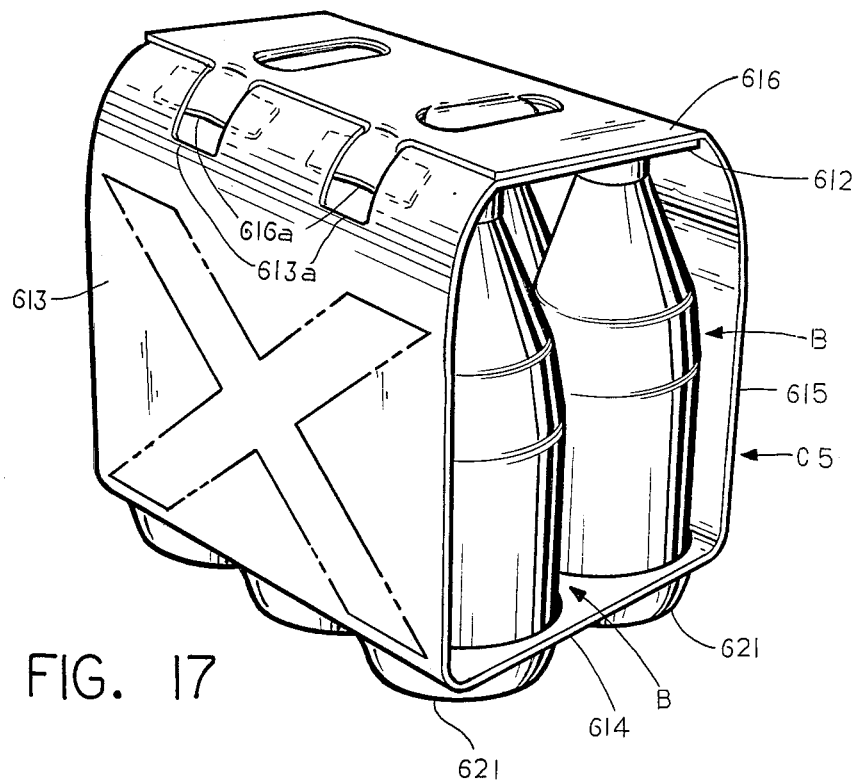
FIG. 17 is a three-dimensional view of yet another embodiment of a carrier according to the present invention in combination with a plurality of like bottles enclosed by such carrier.
Figure 18:
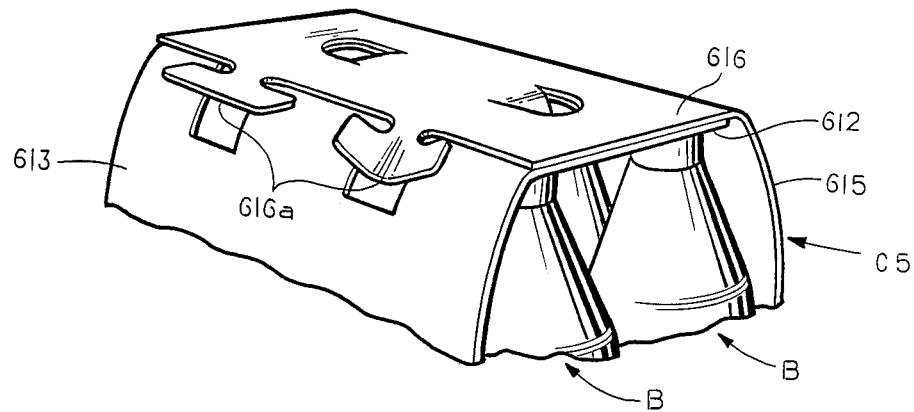
FIG. 18 is a fragmentary view of the carrier of FIG. 17 depicting a step in the closing of such carrier.
Figure 19:
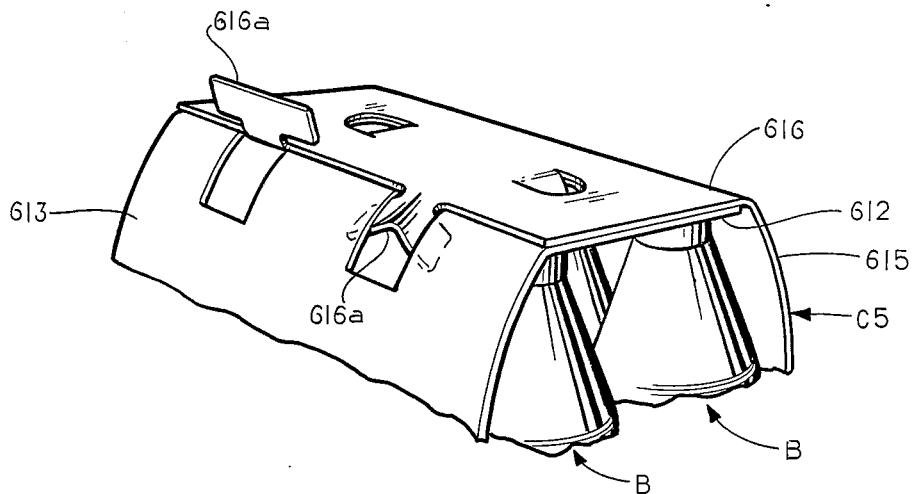
FIG. 19 is a fragmentary view of the carrier of FIG. 17 depicting a step in the opening of such carrier.

FIG. 17 depicts another embodiment of a carrier, indicated generally by reference character C5, which is shown in bottle carrying relationship with a plurality of filled and capped bottles B. The bottoms of the bottles B are held in pockets 621 in the bottom panel 614 of carrier C5, which may be similar in construction and function to the pockets 21 and 521 of the carrier C of the embodiment of FIGS. 1–8, or the carrier C4 of the embodiment of FIG. 16, respectively. Carrier C5 has sides 613 and 615, respectively, and a double thickness top structure made up of an inner panel 612 and an outer panel 616. Inner panel 612 is foldably attached to, and extends inwardly from, side panel 613, and outer top panel 616 is foldably attached to, and extends inwardly from, side panel 615. The outer top panel 616 has a pair of spaced-apart T-shaped tabs 616a extending from the outer edge thereof, with the foot of the stem of the T being attached to the top panel 616. Side panel 613 has a pair of spaced apart finger width vertical slots 613a, and a tab 616a is inserted in each slot 613a, after suitable folding or bending as is illustrated with respect to the tab 616a on the right side of the carrier in FIG. 18, to secure the ends of the carrier to one another. Because each slot 613a is wide enough to receive a finger, each tab 616a can be readily removed from its slot 613a to permit the opening of the carrier C5, as is illustrated with respect to the tab 616a on the right side of the carrier in FIG. 19. While not depicted with respect to the illustrated embodiments of the invention, any of them could, if desired, be provided with small holes in the lowermost region thereof to provide for the drainage of liquid. This could be advantageous, for example, in the case of the accidental breakage of one of the beverage containers carried by the carrier.

The best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and it is, therefore, desired to limit the invention only in accordance with the appended claims.

What is claimed is:

1. In combination with a plurality of like containers, a reusable one-piece wrap-type carrier for carrying said containers and comprising, in combination: a bottom panel; means formed in said carrier for engaging the bottoms of said containers in spaced apart configuration; first and second generally vertically extending panels formed integrally with said bottom panel and folded with respect thereto; generally horizontally extending panel means formed integrally with one of said first and second generally vertically extending panels, said generally horizontally extending panel means extending across the tops of said containers; and releasable and reclosable locking means securing said generally horizontally extending panel means to the other of said generally vertically extending panels, said locking means comprising a tab extending outwardly from an edge of said carrier for receiving said tab, said carrier being provided with a finger width vertical slot disposed on one side of and adjacent said horizontally extending slot to help to remove said tab from said horizontally extending slot.

2. A combination accordance with claim 1 wherein said carrier is provided with a second finger width vertical slot disposed on the other side of and adjacent said horizontally extending slot.

3. In combination with a plurality of like beverage containers, a reusable one-piece wrap-type carrier for carrying said beverage containers and comprising, in combination: a bottom panel; means formed in said carrier for engaging the bottoms of said beverage containers in spaced-apart configuration; first and second generally vertically extending panels formed integrally with said bottom panel and folded with respect thereto; generally horizontally extending panel means formed integrally with one of said first and second generally vertically extending panels, said generally horizontally extending panel means extending across the tops of said containers; said generally horizontally extending panel means comprising a first horizontal panel which is formed integrally with one of said first and second generally vertically extending panels and a second horizontal panel which is formed integrally with the other of said first and second generally vertically extending panels, said first and second horizontal panels lying in substantial surface to surface contact with one another to form a double thickness layer of material at the top of said carrier; means for engaging the top of said beverage containers comprising a series of spaced-apart holes in said first horizontal panel, each of said holes having the top of one of said beverage containers protruding therethrough, and a series of spaced-apart pockets in said second horizontal panel, each of said pockets having the top of one of said containers protruding thereinto; and releasable and recloseable locking means securing said generally horizontally extending panel means to the other of said generally vertically extending panels.

* * * * *